US012700426B1

(12) United States Patent
Biskeborn et al.

(10) Patent No.: US 12,700,426 B1
(45) Date of Patent: Aug. 4, 2026

(54) MULTICHANNEL LINEAR MAGNETIC TAPE DRIVE HAVING DUAL TILTING ACTUATORS

(71) Applicant: Western Digital Technologies, Inc., San Jose, CA (US)

(72) Inventors: Robert G Biskeborn, Hollister, CA (US); Trevor W. Olson, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 19/096,138

(22) Filed: Mar. 31, 2025

(51) Int. Cl.
| | |
|---|---|
| *G11B 5/00* | (2006.01) |
| *G11B 5/127* | (2006.01) |
| *G11B 5/48* | (2006.01) |
| *G11B 5/584* | (2006.01) |
| *G11B 5/592* | (2006.01) |

(52) U.S. Cl.
CPC .......... *G11B 5/4893* (2013.01); *G11B 5/1278* (2013.01); *G11B 5/5926* (2013.01)

(58) Field of Classification Search
CPC ........... G11B 5/55; G11B 5/588; G11B 17/30; G11B 20/1201; G11B 5/5526; G11B 21/106; G11B 5/00813; G11B 20/1819; G11B 5/584; G11B 5/56; G11B 5/5504; G11B 5/29; G11B 5/23
USPC ...................................... 360/77.04, 77.08, 75
See application file for complete search history.

(56) References Cited

U.S. PATENT DOCUMENTS

| | | | | |
|---|---|---|---|---|
| 7,054,093 B1 * | 5/2006 | Anderson | .......... | G11B 5/00826 |
| 9,007,712 B1 * | 4/2015 | Biskeborn | ................ | G11B 5/56 |
| | | | | 360/76 |

| | | | | |
|---|---|---|---|---|
| 9,263,087 B2 * | 2/2016 | Biskeborn | ........ | G11B 20/10222 |
| 10,236,023 B2 | 3/2019 | Harper | | |
| 11,367,459 B2 | 6/2022 | Jurneke | | |
| 11,935,563 B2 | 3/2024 | Noda et al. | | |

(Continued)

FOREIGN PATENT DOCUMENTS

JP          2005259198 A          9/2005

OTHER PUBLICATIONS

Argumedo, A. J. et al., "Scaling tape-recording areal densities to 100 GB/in2", IBM Journal of Research and Development, Jul./Sep. 2008, pp. 513-527, <https://doi.org/10.1147/rd.524.0513>, Last Accessed Mar. 31, 2025.

(Continued)

*Primary Examiner* — Nabil Z Hindi
(74) *Attorney, Agent, or Firm* — Patterson + Sheridan, LLP

(57) ABSTRACT

The present disclosure generally relates to a tape head module assembly and a tape drive including the tape head module assembly. The tape head module assembly comprises a first tape head module disposed on a first actuator and a second tape head module disposed on a second actuator. The first actuator is configured to move the first tape head module in a first direction and a second direction opposite the first direction to tilt the first tape head module, and the second actuator is configured to move the second tape head module in the first direction and the second direction to tilt the second tape head module. The first tape head module is operable to write data to a tape using perpendicular magnetic recording, and the second tape head module is operable to read-verify the newly written data.

26 Claims, 8 Drawing Sheets

(56) References Cited

U.S. PATENT DOCUMENTS

| | | |
|---|---|---|
| 2009/0201608 A1 | 8/2009 | Argumedo et al. |
| 2011/0051283 A1 | 3/2011 | Harper et al. |
| 2012/0206832 A1 | 8/2012 | Hamidi et al. |
| 2023/0186946 A1 | 6/2023 | Le et al. |
| 2023/0223045 A1 | 7/2023 | Kaddeche et al. |

OTHER PUBLICATIONS

"Protecting Your Archival Data With Improved Tape Dimensional Stability", An Oracle White Paper, Jan. 2011, pp. 1-9, <https://www.oracle.com/technetwork/articles/systems-hardware-architecture/tape-dimensional-stability-294733.pdf>, Last Accessed Mar. 31, 2025.

* cited by examiner

100

100

MULTICHANNEL LINEAR MAGNETIC TAPE DRIVE HAVING DUAL TILTING ACTUATORS

BACKGROUND OF THE DISCLOSURE

Field of the Disclosure

Embodiments of the present disclosure generally relate to a tape head module assembly and a tape drive including the tape head module assembly.

Description of the Related Art

Tape heads of tape drive systems are used to record and read back information on tapes by magnetic processes. Magnetic transducers of the tape heads read data from and write data onto magnetic recording media. Data is written on the magnetic recording media by moving a magnetic write transducer to a location over the media where the data is to be stored. The magnetic write transducer then generates a magnetic field, which encodes the data into the magnetic media. Data is read from the media by the magnetic read transducer through sensing of the magnetic field of the magnetic media.

Conventionally, tape head module assemblies comprising a module comprising write transducers and a module comprising read transducers. The write transducer module is often bonded to the read transducer module and then mounted into a single actuator assembly. The required separation between the write head module and the read head module on the single actuator assembly requires the use of wide write pole tips, such as about 10 μm, to ensure the read transducers remain in the shadow of the write transducers during read-verification. As such, data is written to a magnetic recording media using longitudinal recording, and the data tracks of the magnetic recording media also have a large width of about 500 nm. The large width of the write poles severely limit the achievable signal-to-noise ratio (SNR) in shingled data tracks.

Therefore, there is a need in the art for a tape head assembly able to write data to thin data tracks (e.g., less than about 500 nm) and read-verify the newly written data.

SUMMARY OF THE DISCLOSURE

The present disclosure generally relates to a tape head module assembly and a tape drive including the tape head module assembly. The tape head module assembly comprises a first tape head module disposed on a first actuator and a second tape head module disposed on a second actuator. The first actuator is configured to move the first tape head module in a first direction and a second direction opposite the first direction to tilt the first tape head module, and the second actuator is configured to move the second tape head module in the first direction and the second direction to tilt the second tape head module. The first tape head module is operable to write data to a tape using perpendicular magnetic recording, and the second tape head module is operable to read-verify the newly written data.

In one embodiment, a tape head module assembly comprises a first tape head module comprising a first row of write transducers and a first row of read transducers disposed adjacent to the first row of write transducers on a media facing surface (MFS), a first actuator, wherein the first tape head module is disposed on the first actuator, and wherein the first actuator is configured to tilt the first tape head module, a second tape head module spaced from the first tape head module, the second tape head module comprising a second row of write transducers and a second row of read transducers disposed adjacent to the second row of write transducers on the MFS, and a second actuator, wherein the second tape head module is disposed on the second actuator, wherein the second actuator is configured to tilt the second tape head module, and wherein the first tape head module is operable to write data to a tape and the second tape head module is operable to read-verify the data.

In another embodiment, a tape head module assembly comprises a first pair of tape head modules comprising a first write head module and a first read head module disposed adjacent to the first write head module, wherein the first write head module comprises a first row of write transducers, and wherein the first read head module comprises a first row of read transducers, a first actuator, wherein the first pair of tape head modules is disposed on the first actuator, and wherein the first actuator is configured to tilt the first pair of tape head modules, a second pair of tape head modules spaced from the first pair of tape head modules, the second pair of tape head modules comprising a second write head module and a second read head module disposed adjacent to the second write head module, wherein the second write head module comprises a second row of write transducers, and wherein the second read head module comprises a second row of read transducers, and a second actuator, wherein the second pair of tape head modules is disposed on the second actuator, wherein the second actuator is configured to tilt the second pair of tape head modules, and wherein the first pair of tape head modules is operable to write data to a tape and the second pair of tape head modules is operable to read-verify the data.

In yet another embodiment, a tape drive comprises a tape head module assembly, the tape head module assembly comprising: a first pair of tape head modules comprising a first write head module and a first read head module disposed adjacent to the first write head module, wherein the first write head module comprises a first row of monopole write transducers, each monopole write transducer having a pole tip width of about 150 nm, and wherein the first read head module comprises a first row of read transducers, a first actuator, wherein the first pair of tape head modules is disposed on the first actuator, and wherein the first actuator is configured to tilt the first pair of tape head modules, a second pair of tape head modules spaced from the first pair of tape head modules, the second pair of tape head modules comprising a second write head module and a second read head module disposed adjacent to the second write head module, wherein the second write head module comprises a second row of monopole write transducers, each monopole write transducer having a pole tip width of about 150 nm, and wherein the second read head module comprises a second row of read transducers, and a second actuator, wherein the second pair of tape head modules is disposed on the second actuator, wherein the second actuator is configured to tilt the second pair of tape head modules, and wherein the first pair of tape head modules is operable to write data to a tape using perpendicular magnetic recording and the second pair of tape head modules is operable to read-verify the data.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to a tape head module assembly and a tape drive including the tape head module assembly. The tape head module assembly comprises a first tape head module disposed on a first actuator and a second tape head module disposed on a second actuator. The first actuator is configured to move the first tape head module in a first direction and a second direction opposite the first direction to tilt the first tape head module, and the second actuator is configured to move the second tape head module in the first direction and the second direction to tilt the second tape head module. The first tape head module is operable to write data to a tape using perpendicular magnetic recording, and the second tape head module is operable to read-verify the newly written data.

Figure 1A:
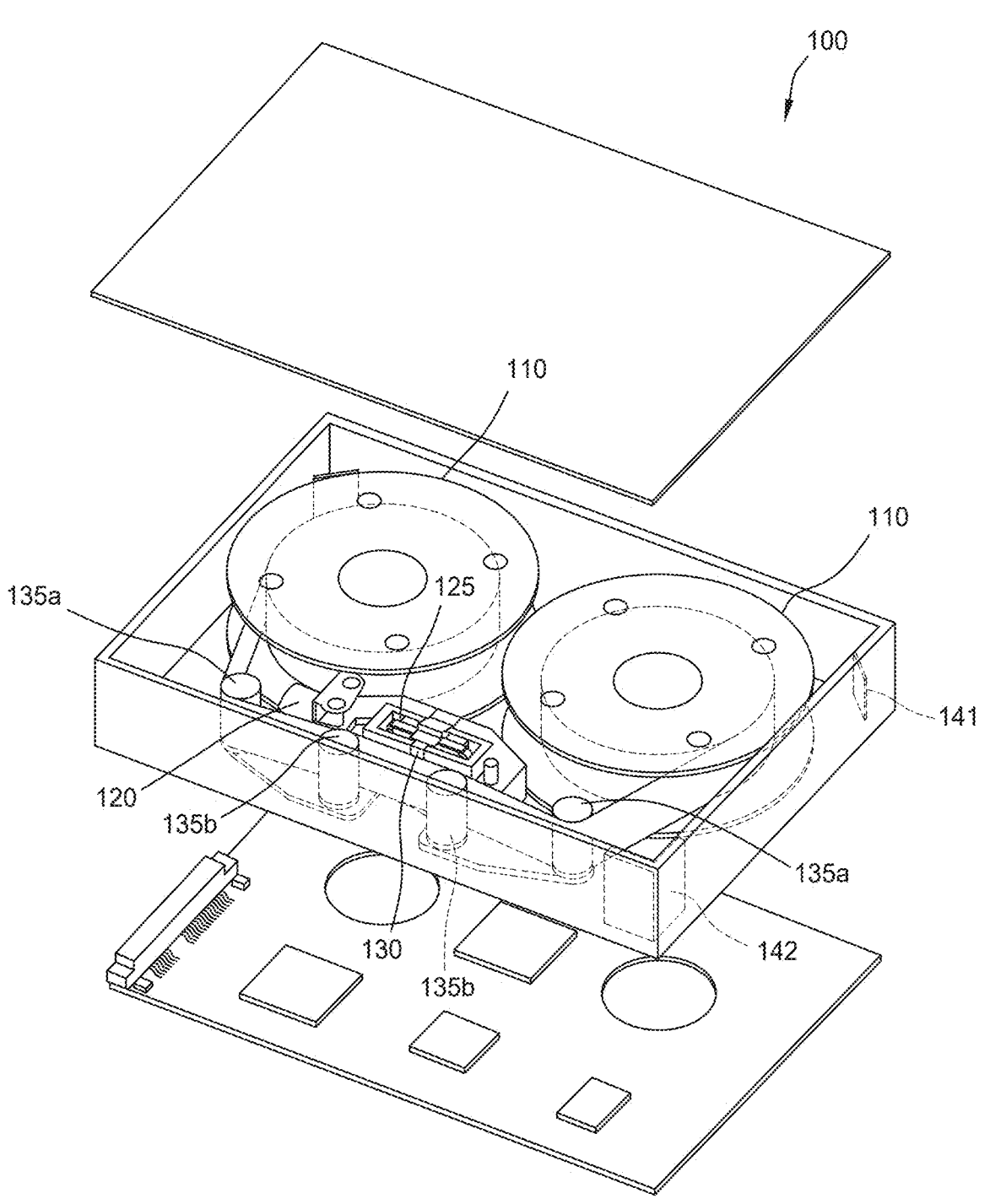
FIGS. 1A-1C illustrate a perspective exploded view, a simplified top down, and side profile view of a tape drive, in accordance with some embodiments.
Figure 1B:
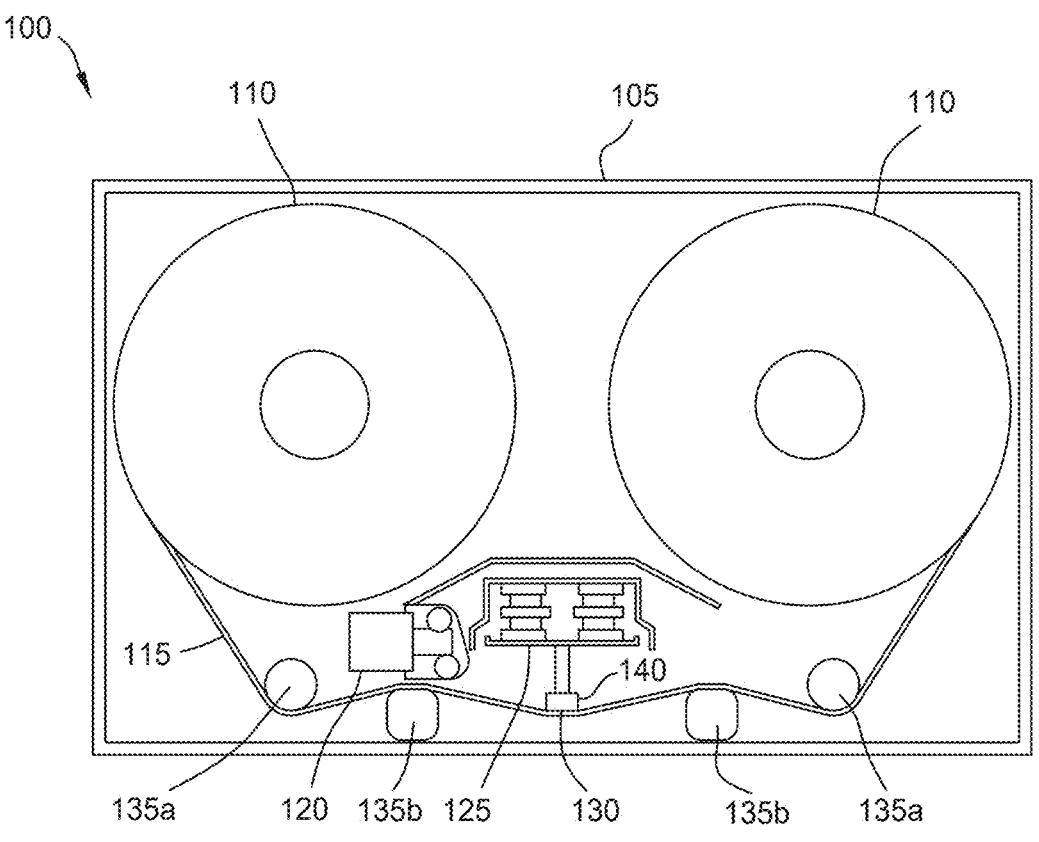
Figure 1C:
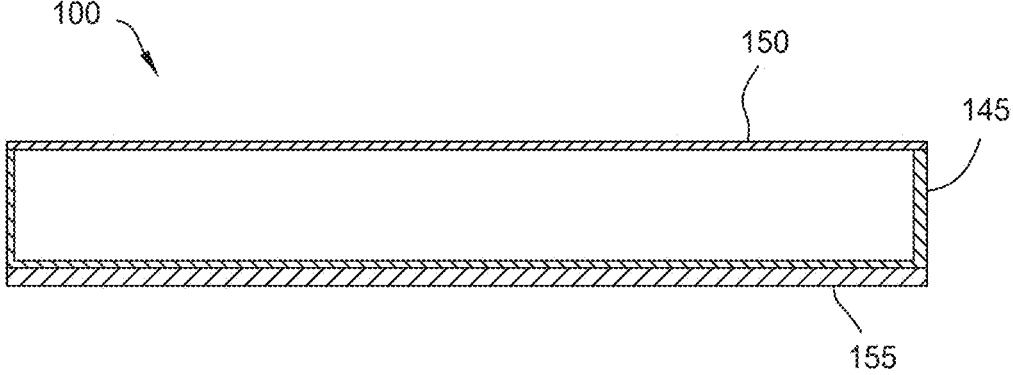

FIGS. 1A-1C illustrate a perspective exploded view, a simplified top down, and side profile view of a tape drive 100, in accordance with some embodiments. The tape drive 100 may be a captive tape drive or a tape embedded drive (TED). Focusing on FIG. 1B, for example, the tape drive comprises a casing 105, one or more tape reels 110, one or more motors (e.g., a stepping motor 120 (also known as a stepper motor), a voice coil motor (VCM) 125, etc.) a head assembly 130 with one or more read heads and one or more write heads, and tape guides/rollers 135a, 135b. In the descriptions herein, the term "head assembly" may be referred to as "magnetic recording head", interchangeably, for exemplary purposes. Focusing on FIG. 1C, for example, the tape drive further comprises a printed circuit board assembly (PCBA) 155. In an embodiment, most of the components are within an interior cavity of the casing, except the PCBA 155, which is mounted on an external surface of the casing 105. The same components are illustrated in a perspective view in FIG. 1A. In the descriptions herein, the term "tape" may be referred to as "magnetic media", interchangeably, for exemplary purposes.

In the illustrated embodiments, two tape reels 110 are placed in the interior cavity of the casing 105, with the center of the two tape reels 110 on the same level in the cavity and with the head assembly 130 located in the middle and below the two tape reels 110. Tape reel motors located in the spindles of the tape reels 110 can operate to wind and unwind the tape media 115 in the tape reels 110. Each tape reel 110 may also incorporate a tape folder to help the tape media 115 be neatly wound onto the reel 110. One or more of the tape reels 110 may form a part of a removable cartridge and are not necessarily part of the tape drive 100. In such embodiments, the tape drive 100 may not be a tape embedded drive as it does not have embedded media, the drive 100 may instead be a tape drive configured to accept and access magnetic media or tape media 115 from an insertable cassette or cartridge (e.g., an LTO drive), where the insertable cassette or cartridge further comprises one or more of the tape reels 110 as well. In such embodiments, the tape or media 115 is contained in a cartridge that is removable from the drive 100. The tape media 115 may be made via a sputtering process to provide improved areal density. The tape media 115 comprises two surfaces, an oxide side and a substrate side. The oxide side is the surface that can be magnetically manipulated (written to or read from) by one or more read/write heads. The substrate side of the tape media 115 aids in the strength and flexibility of the tape media 115.

Tape media 115 from the tape reels 110 are biased against the guides/rollers 135a, 135b (collectively referred to as guides/rollers 135) and are movably passed along the head assembly 130 by movement of the reels 110. The illustrated embodiment shows four guides/rollers 135a, 135b, with the two guides/rollers 135a furthest away from the head assembly 130 serving to change direction of the tape media 115 and the two guides/rollers 135b closest to the head assembly 130 by pressing the tape media 115 against the head assembly 130.

As shown in FIG. 1A, in some embodiments, the guides/rollers 135 utilize the same structure. In other embodiments, as shown in FIG. 1B, the guides/rollers 135 may have more specialized shapes and differ from each other based on function. Furthermore, a lesser or a greater number of rollers may be used. For example, the two function rollers may be cylindrical in shape, while the two functional guides may be flat-sided (e.g., rectangular prism) or clip shaped with two prongs and the film moving between the prongs of the clip.

The voice coil motor 125 and stepping motor 120 may variably position the tape head(s) transversely with respect to the width of the recording tape. The stepping motor 120 may provide coarse movement, while the voice coil motor 125 may provide finer actuation of the head(s). In an embodiment, servo data may be written to the tape media to aid in more accurate position of the head(s) along the tape media 115.

In addition, the casing 105 comprises one or more particle filters 141 and/or desiccants 142, as illustrated in FIG. 1A, to help maintain the environment in the casing. For example, if the casing is not airtight, the particle filters may be placed where airflow is expected. The particle filters and/or desiccants may be placed in one or more of the corners or any other convenient place away from the moving internal components. For example, the moving reels may generate internal airflow as the tape media winds/unwinds, and the particle filters may be placed within that airflow.

There is a wide variety of possible placements of the internal components of the tape drive 100 within the casing 105. In particular, as the head mechanism is internal to the casing in certain embodiments, the tape media 115 may not be exposed to the outside of the casing 105, such as in conventional tape drives. Thus, the tape media 115 does not need to be routed along the edge of the casing 105 and can be freely routed in more compact and/or otherwise more efficient ways within the casing 105. Similarly, the head(s) 130 and tape reels 110 may be placed in a variety of locations to achieve a more efficient layout, as there are no design requirements to provide external access to these components.

As illustrated in FIG. 1C, the casing 105 comprises a cover 150 and a base 145. The PCBA 155 is attached to the bottom, on an external surface of the casing 105, opposite the cover 150. As the PCBA 155 is made of solid state electronics, environmental issues are less of a concern, so it does not need to be placed inside the casing 105. That leaves room inside casing 105 for other components, particularly, the moving components and the tape media 115 that would benefit from a more protected environment.

In some embodiments, the tape drive 100 is sealed. Sealing can mean the drive is hermetically sealed or simply enclosed without necessarily being airtight. Sealing the drive may be beneficial for tape film winding stability, tape film reliability, and tape head reliability. Desiccant may be used to limit humidity inside the casing 105.

In one embodiment, the cover 150 is used to hermetically seal the tape drive. For example, the drive 100 may be hermetically sealed for environmental control by attaching (e.g., laser welding, adhesive, etc.) the cover 150 to the base 145. The drive 100 may be filled by helium, nitrogen, hydrogen, or any other typically inert gas.

In some embodiments, other components may be added to the tape drive 100. For example, a pre-amp for the heads may be added to the tape drive. The pre-amp may be located on the PCBA 155, in the head assembly 130, or in another location. In general, placing the pre-amp closer to the heads may have a greater effect on the read and write signals in terms of signal-to-noise ratio (SNR). In other embodiments, some of the components may be removed. For example, the filters 141 and/or the desiccant 142 may be left out.

In various embodiments, the drive 100 includes controller 140 integrated circuits (IC) (or more simply "a controller 140") (e.g., in the form of one or more System on Chip (SoC)), along with other digital and/or analog control circuitry to control the operations of the drive. For example, the controller 140 and other associated control circuitry may control the writing and reading of data to and from the magnetic media, including processing of read/write data signals and any servo-mechanical control of the media and head module. In the description below, various examples related to writing and reading and verifying of written data, as well as control of the tape head and media to achieve the same, may be controlled by the controller 140. As an example, the controller 140 may be configured to execute firmware instructions for the various same gap verify embodiments described below.

Figure 2:
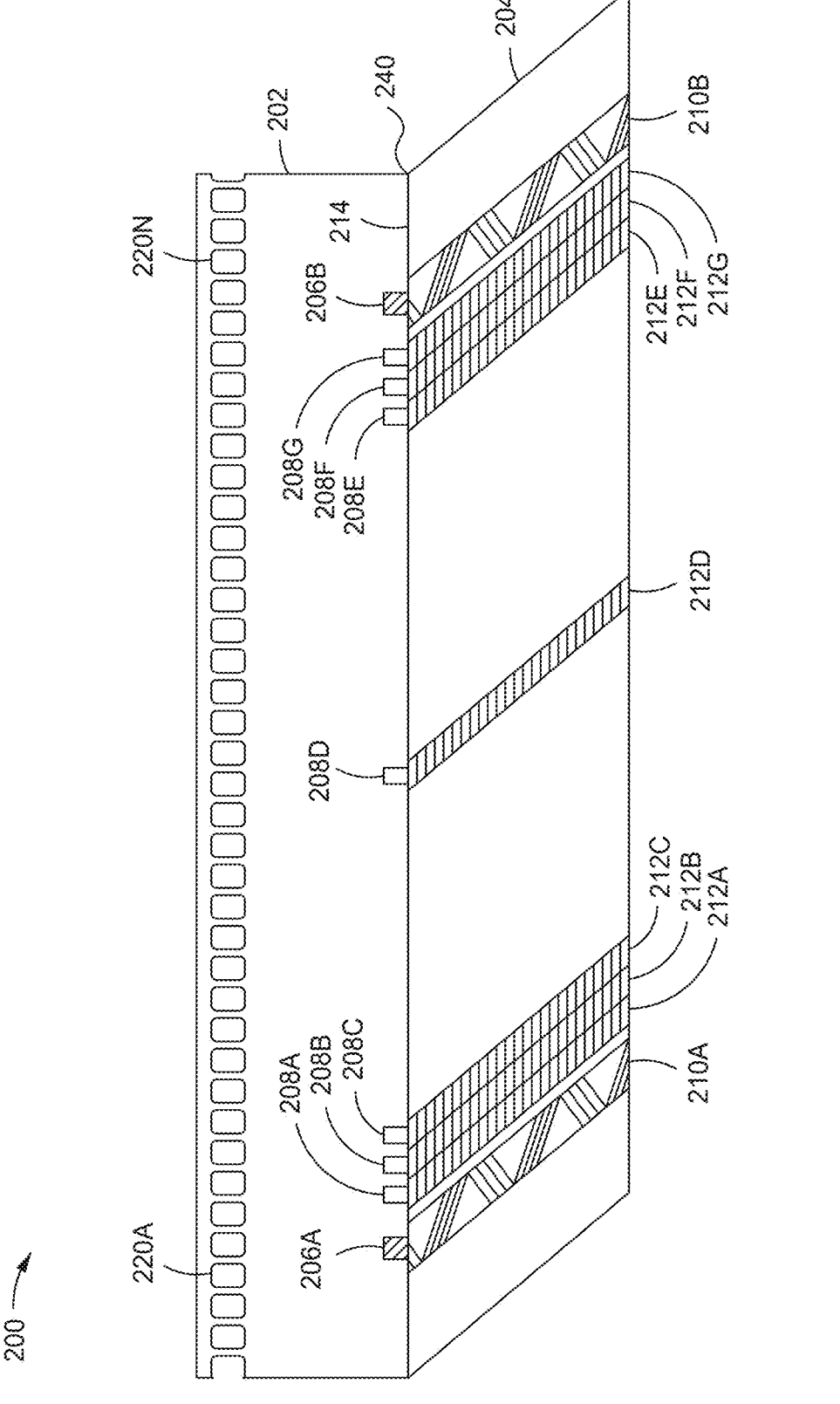
FIG. 2 is a schematic illustration of a tape head and tape that are aligned.

FIG. 2 is a schematic illustration of a tape head module 200 and a tape 204 that are aligned. The tape head module 200 comprises a tape head body 202 that is aligned with the tape 204. The tape 204 moves past the tape head module 200 during read and/or write operations. The tape head module 200 has a media facing surface (MFS) 214 that faces the tape 204. The tape head module 200 is coupled to a controller, which may be the controller 140 of FIG. 1.

The tape head body 202 comprises a first servo element pair 206A and a second servo element pair 206B spaced therefrom. It is to be understood that while two servo element pairs have been shown, the disclosure is not limited to two servo element pairs. Rather, it is contemplated that more or less servo element pairs may be present. A plurality of data heads 208A-208G is disposed between the first servo element pair 206A and the second servo element pair 206B. It is to be understood that while seven data heads have been shown, the disclosure is not limited to seven data heads. Rather, the number of data heads can be more or less than seven, depending on the requirements of the embodiment. For example there can be sixteen, thirty two, sixty four or more data heads utilized in the tape head body 202.

A plurality of pads 220A-220N is electrically coupled to the data head body 202. The plurality of pads 220A-220N coupled to the data head body 202 is not limited to the number shown in FIG. 2. Rather, more or less pads are contemplated. The pads 220A-220N are used to connect the drive electronics to the servo element pairs 206A, 206B and to data read and writer elements. The pads 220A-220N are used to establish the potential across the servo reader by means of a power supply (not shown) embedded in the tape head module 200.

The tape 204 comprises a first servo track 210A and a second servo track 210B. The first servo track 210A and the second servo track 210B are spaced apart allowing the tape head module 200 to monitor and control the average position of the data heads 208A-208G relative to the data tracks 212A-212G on the tape 204. It is to be understood that while two servo tracks have been shown, the disclosure is not limited to two servo tracks. Rather, the number of servo tracks can be more or less than two, depending on the requirements of the embodiment.

The tape 204 further comprises a plurality of data tracks 212A-212G disposed between the first servo track 210A and the second servo track 210B. It is to be understood that while seven data tracks have been shown, the disclosure is not limited to the seven data tracks. Rather, the number of data tracks can be more or less than seven, depending on the requirements of the embodiment. In the embodiment of FIG. 2, the first servo element pair 206A reads its lateral position information (e.g., alignment) over the first servo track 210A. The second servo element pair 206B is aligned with the second servo track 210B. The combined information allows the servo actuator(s) of the tape head module 200 to align the data heads 208A-208G such that the center data head (e.g., 208D) is centered on tape 204. Such actuators will be further described in the later figures. The plurality of data heads 208A-208G is thus individually aligned with the plurality of data tracks 212A-212N for best case positioning. In this embodiment the first servo element pair 206A, the second servo element pair 206B, the first servo track 210A, the second servo track 210B, the plurality of data heads 208A-

208G, and the plurality of data tracks 212A-212G are able to read and/or write the data accurately because all are aligned perpendicular to the direction of travel of the tape 204.

Figure 3A:
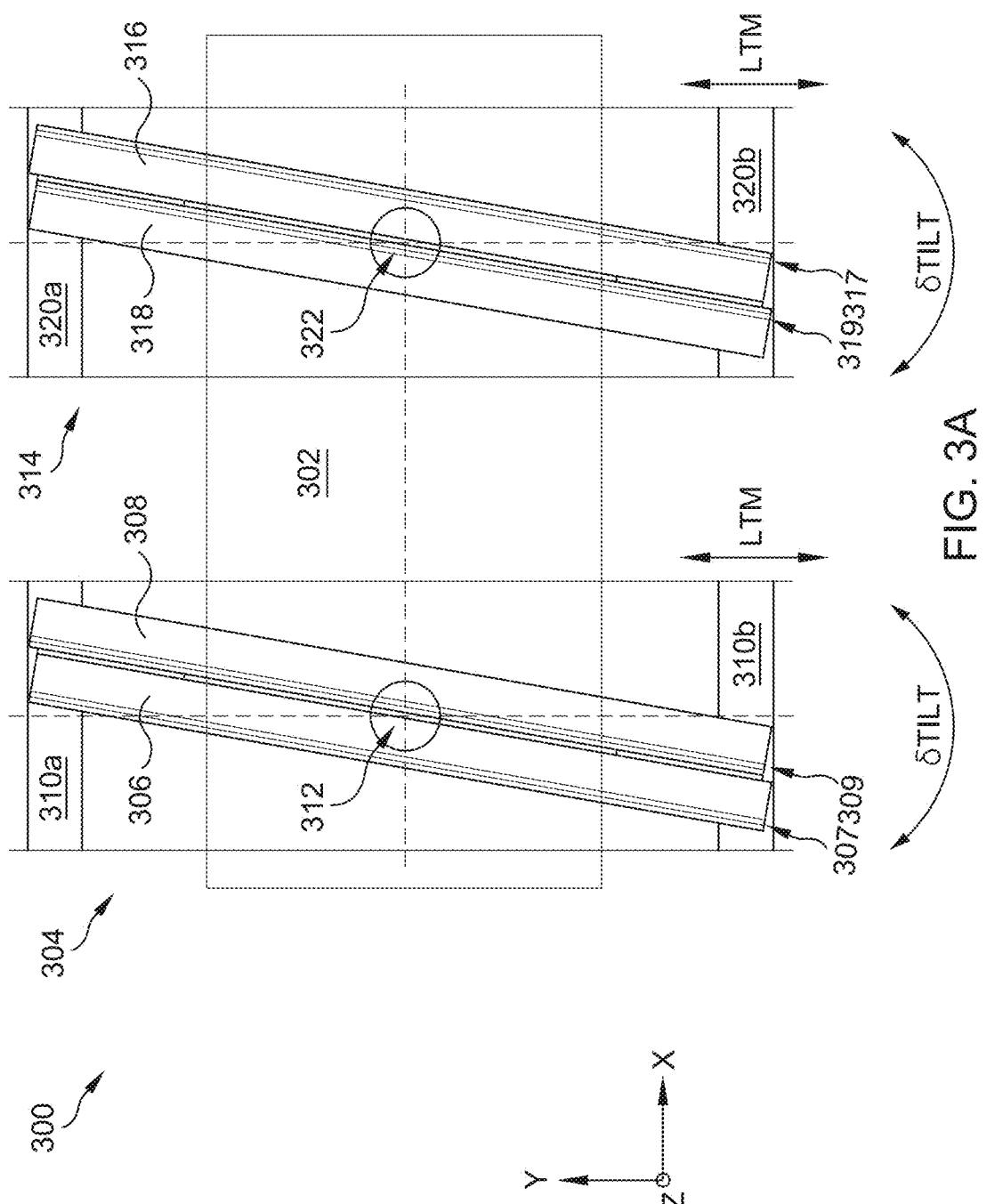
FIGS. 3A-3B illustrate a tape head module assembly, according to one embodiment.
Figure 3B:
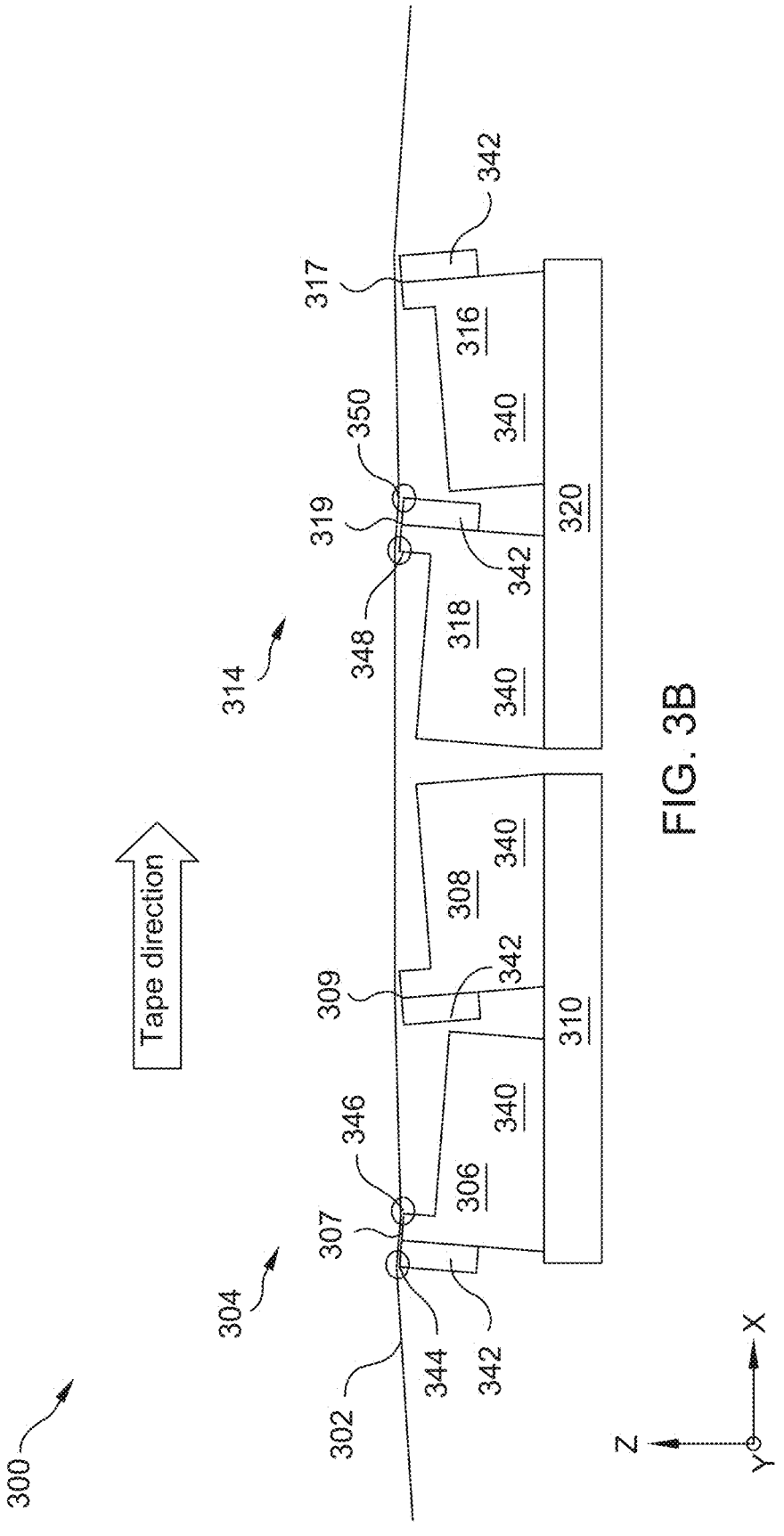

FIGS. 3A-3B illustrate a tape head module assembly 300, according to one embodiment. FIG. 3A illustrates a media facing surface (MFS) view of the tape head module assembly 300, and FIG. 3B illustrates a side view of the tape head module assembly 300. The tape head module assembly 300 may be utilized within a tape drive comprising a controller, such as the captive tape drive or insertable cartridge tape drive 100 of FIG. 1A. The tape head module assembly 300 may include one or more of tape head module(s) 200 of FIG. 2.

The tape head module assembly 300 comprises a first pair of tape head modules 304 and a second pair of tape head modules 314 disposed over a tape 302. The first and second pairs of tape head modules 304, 314 are each individually statically tilted in the x-direction about 5° to about 10°. The first pair of tape head modules 304 are spaced a distance of about 10 mm to about 50 mm in the x-direction from the second pair of tape head modules 314. The first pair of tape head modules 304 comprises a write head module 306 comprising a first row of write transducers or writers 307 and a read head module 308 comprising a first row of read transducers or readers 309. The first row of writers 307 and the second row of readers 309 each face the −x-direction such that the second row of readers 309 faces the back of the write head module 306. The write head module 306 and the read head module 308 may be bonded together.

The second pair of tape head modules 314 comprises a write head module 316 comprising a second row of writers 317 and a read head module 318 comprising a second row of readers 319. The second row of writers 317 and the second row of readers 319 each face the x-direction such that the second row of readers 319 faces the back of the write head module 316. As such, the first pair of tape head modules 304 and the second pair of tape head modules 314 face opposite directions, and each face outwards away from one another. The write head module 316 and the read head module 318 may be bonded together.

The first pair of tape head modules 304 are disposed on a first actuator 310, where actuator arms 310a, 310b of the first actuator 310 are disposed on either end of the first pair of tape head modules 304. The first actuator 310 is configured to move the first pair of tape head modules 304 in the x-direction and −x-direction to tilt the first pair of tape head modules 304 by individually moving the actuator arms 310a, 310b in opposite directions to correct for tape dimensional stability (TDS) and skew (STILT). The first actuator 310 is configured to tilt the first pair of tape head modules 304 in the x-direction and the −x-direction about 9.5° to about 10.5° around an axis of rotation 312. The axis of rotation 312 may be a center of the first pair of tape head modules 304. The first actuator 310 is further configured to move in the y-direction and −y-direction (i.e., across a width of the tape 302) about ±500 μm, to move the pair of tape head modules 304 to correct for lateral tape motion (LTM). The actuator arms 310a, 310b move in sync in the y-direction and −y-direction.

Similarly, the second pair of tape head modules 314 are disposed on a second actuator 320, where actuator arms 320a, 320b of the second actuator 320 are disposed on either end of the second pair of tape head modules 314. The second actuator 320 is configured to move the second pair of tape head modules 314 in the x-direction and −x-direction tilt the second pair of tape head modules 314 by individually moving the actuator arms 320a, 320b in opposite directions to correct for TDS and skew (δTILT). The second actuator 320 is configured to tilt the second pair of tape head modules 314 in the x-direction and the −x-direction about 9.5° to about 10.5° around an axis of rotation 322. The axis of rotation 322 may be a center of the first pair of tape head modules 314. The second actuator 320 is further configured to move in the y-direction and −y-direction (i.e., across a width of the tape 302) about ±500 μm, to move the second pair of tape head modules 314 to correct for LTM. The actuator arms 320a, 320b move in sync in the y-direction and −y-direction.

The write head modules 306, 316 each comprises 64 or more write elements (which in certain embodiments, are monopole writers) that are configured for perpendicular magnetic recording (PMR) of data to the tape 302, as discussed below in FIG. 6. The tip of the monopole write poles of the writers each have a width of about 150 nm, enabling the monopole writers to write on narrow data tracks of the tape 302, such as data tracks having a width of about 150 nm. The monopole writers are configured to write data on particulate tape media, sputtered tape media, or tape media having a soft magnetic underlayer. The read head modules 308, 318 each comprise 64 or more readers configured to read data written to the tape 302 by the monopole writers.

During operation, when the tape 302 moves in the x-direction, the write head module 306 of the first pair of tape head modules 304 is configured to write data to the tape, and the read head module 318 of the second pair of tape head modules 314 is configured to read-verify the newly written data. When the tape 302 moves in the −x-direction, the write head module 316 of the second pair of tape head modules 314 writes data, and the read head module 308 of the first pair of tape head modules 304 read-verifies the newly written data. Because the first and second tape head modules 304, 314 are disposed on individual actuators 310, 320, the first and second pair of tape head modules 304, 314 can each individually positioned or adjusted as needed to write and read-verify the data, enabling the tape head module assembly 300 to both write to and read from narrow data tracks that have been written using PMR.

As shown in FIG. 3B, each head module 306, 308, 316, 318 comprises a closure 340 and a substrate 342, where the closures 340 of the first pair of tape head modules 304 are disposed on the first actuator 310, and the closures 340 of the second pair of tape head modules 314 are disposed on the second actuator 320. Each head module 306, 308, 316, and 318 in precisely angled when placed on the actuators 310, 320 to reduce the total number of skiving edges during operation.

During operation, when the tape 302 moves in the x-direction, the tape 302 has a positive or overwrap angle on a first edge 344 of the write head module 306, enabling the tape 302 to skive and be sucked down onto the MFS and first row of writers 307. The tape 302 is then underwrapped on the second edge 346 (opposite the first edge 344) of the write head module 306 to enable the tape 302 to fly over the read head module 308 such that the tape 302 is spaced from the MFS and first row of readers 309.

As the tape 302 moves over the read head module 318, the tape 302 has a positive or overwrap angle on a first edge 348 of the read head module 318, enabling the tape 302 to skive and be sucked down onto the MFS and second row of readers 319. The tape 302 is then underwrapped on the second edge 350 (opposite the first edge 348) of the read head module 318 to enable the tape 302 to fly over the write head module 316 such that the tape 302 is spaced from the MFS and second row of writers 317. Thus, both of active modules (i.e., the write head module 306 and the read head module 318) have only one skiving edge. As such, the tape 302 experiences less wear and tear, prolonging the life of the tape 302.

Figure 4:
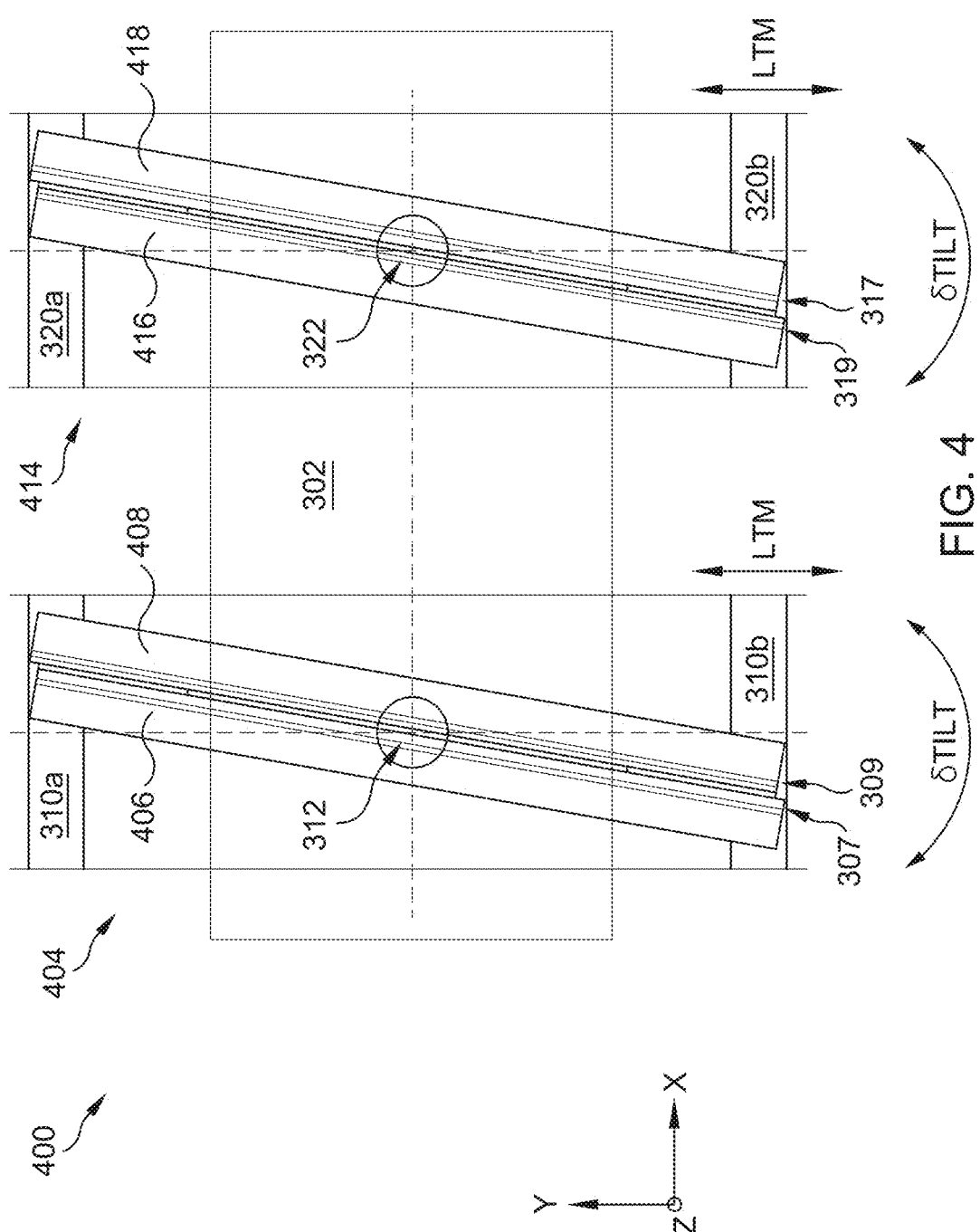
FIG. 4 illustrates a MFS view of a tape head module assembly, according to another embodiment.

FIG. 4 illustrates a MFS view of a tape head module assembly 400, according to another embodiment. The tape head module assembly 400 may be utilized within a tape drive comprising a controller, such as the captive tape drive or tape drive 100 of FIG. 1A. The tape head module assembly 400 may be utilized with, or be a part of, the tape head module 200 of FIG. 2.

The tape head module assembly 400 is similar to the tape head module assembly 300 of FIGS. 3A-3B; however, the first row of writers 307 faces the first row of readers 309, and the second row of writers 317 faces the second row of readers 319.

The tape head module assembly 400 comprises a first pair of tape head modules 404 and a second pair of tape head modules 414 disposed over a tape 302. The first and second pairs of tape head modules 404, 414 are each individually statically tilted in the x-direction about 5° to about 10°. The first pair of tape head modules 404 are spaced a distance of about 10 mm to about 50 mm in the x-direction from the second pair of tape head modules 414. The first pair of tape head modules 404 comprises a write head module 406 comprising a first row of writers 307 and a read head module 408 comprising a first row of readers 309. The first row of writers 307 faces the x-direction and the first row of readers 309 faces the −x-direction such that the first row of writers 307 and the first row of readers 309 are face to face. The write head module 406 and the read head module 408 may be bonded together.

The second pair of tape head modules 414 comprises a write head module 416 comprising a second row of writers 317 and a read head module 418 comprising a second row of readers 319. The second row of writers 317 faces the −x-direction and the second row of readers 319 faces the x-direction such that the first row of writers 317 and the first row of readers 319 are face to face. The write head module 416 and the read head module 418 may be bonded together.

The first pair of tape head modules 404 are disposed on the first actuator 310, where actuator arms 310a, 310b of the first actuator 310 are disposed on either end of the first pair of tape head modules 404. The actuator arms 310a, 310b are configured to individually move in the x-direction and the −x-direction to tilt the first pair of tape head modules 404, and to move in sync in the y-direction and −y-direction to correct for LTM. Similarly, the second pair of tape head modules 414 are disposed on the second actuator 320, where actuator arms 320a, 320b of the second actuator 320 are disposed on either end of the second pair of tape head modules 414. The actuator arms 320a, 320b are configured to individually move in the x-direction and the −x-direction to tilt the second pair of tape head modules 414, and to move in sync in the y-direction and −y-direction to correct for LTM.

The write head modules 406, 416 each comprise 64 or more monopole writers that are configured for PMR of data to the tape 302, as discussed below in FIG. 6. The monopole write poles of the writers each have a width of about 150 nm, enabling the monopole writers to write on narrow data tracks of the tape 302, such as data tracks having a width of about 150 nm. The monopole writers are configured to write data on particulate tape media, sputtered tape media, or tape media having a soft magnetic underlayer. The read head modules 408, 418 each comprise 64 or more readers configured to read data written to the tape 302 by the monopole writers.

During operation, when the tape 302 moves in the x-direction, the write head module 406 of the first pair of tape head modules 404 is configured to write data to the tape, and the read head module 418 of the second pair of tape head modules 414 is configured to read-verify the newly written data. When the tape 302 moves in the −x-direction, the write head module 416 of the second pair of tape head modules 414 writes data, and the read head module 408 of the first pair of tape head modules 404 read-verifies the newly written data. Because the first and second tape head modules 404, 414 are disposed on individual actuators 310, 320, the first and second pair of tape head modules 404, 414 can each individually positioned or adjusted as needed to write and read-verify the data, enabling the tape head module assembly 400 to both write to and read from narrow data tracks that have been written using PMR.

Figure 5:
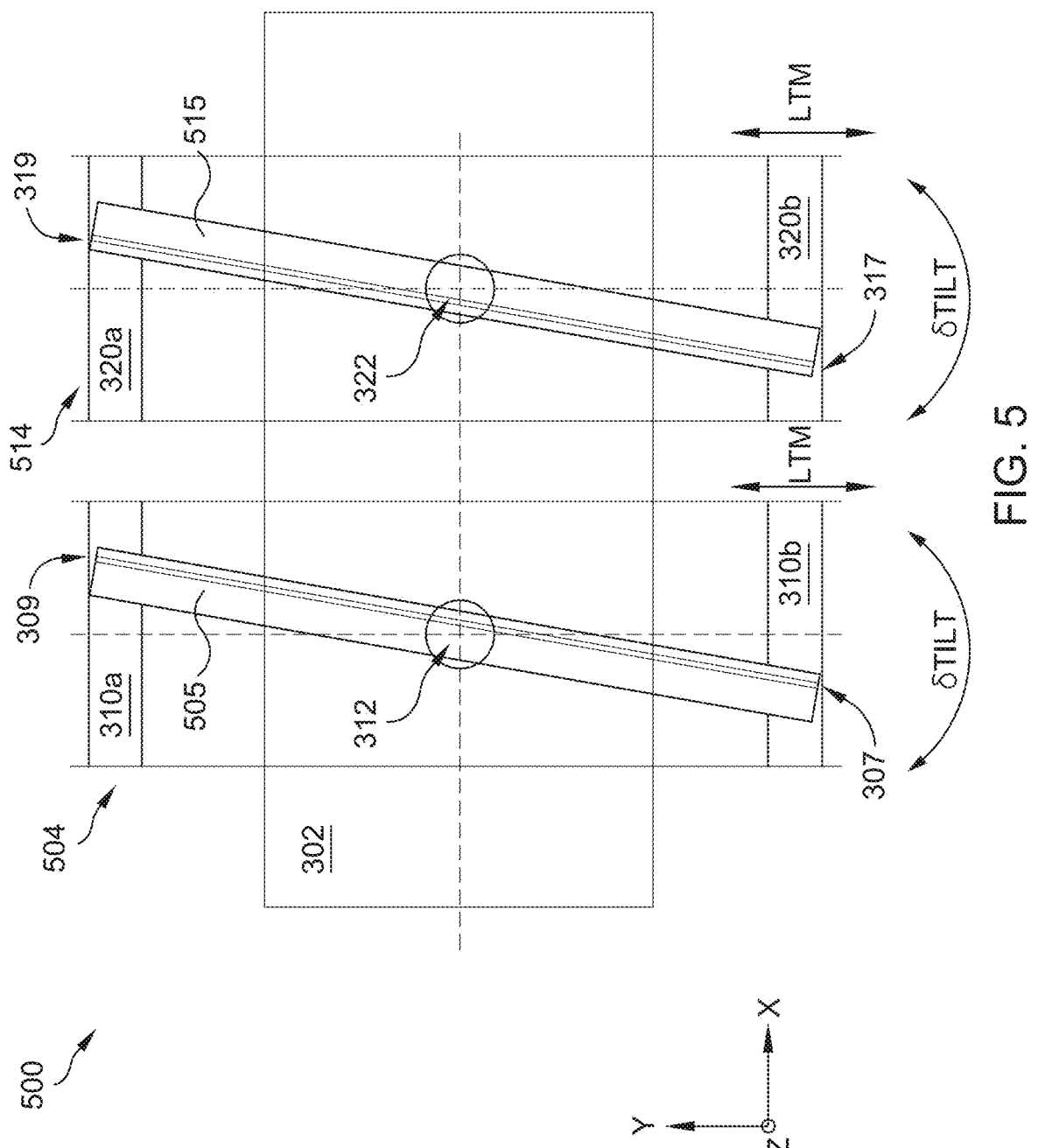
FIG. 5 illustrates a MFS view of a tape head module assembly, according to yet another embodiment.

FIG. 5 illustrates a MFS view of a tape head module assembly 500, according to yet another embodiment. The tape head module assembly 500 may be utilized within a tape drive comprising a controller, such as the captive tape drive or tape drive 100 of FIG. 1A. The tape head module assembly 500 may be utilized with, or be a part of, the tape head module 200 of FIG. 2.

The tape head module assembly 500 comprises a first tape head module 505 and a second head module 515 disposed over a tape 302. The first and second tape head module 505, 515 are each individually statically tilted in the x-direction about 5° to about 10°. The first tape head module 505 is spaced a distance of about 10 mm to about 50 mm in the x-direction from the second head module 515. The first tape head module 505 comprises both writers and readers, where the first tape head module 505 comprises a first row of writers 307 disposed adjacent to a first row of readers 309. The second tape head module 515 comprises both writers and readers, where the second tape head module 515 comprises a second row of writers 317 disposed adjacent to a second row of readers 319. Thus, rather than having four tape head modules, tape head module assembly 500 comprises only two.

The first tape head module 505 is disposed on the first actuator 310, where actuator arms 310a, 310b of the first actuator 310 are disposed on either end of the first tape head module 505. The actuator arms 310a, 310b are configured to individually move in the x-direction and the −x-direction to tilt the first pair of tape head modules 505, and to move in sync in the y-direction and −y-direction to correct for LTM. Similarly, the second tape head module 515 is disposed on the second actuator 320, where actuator arms 320a, 320b of the second actuator 320 are disposed on either end of the second tape head module 515. The actuator arms 320a, 320b are configured to individually move in the x-direction and the −x-direction to tilt the second pair of tape head modules 515, and to move in sync in the y-direction and −y-direction to correct for LTM.

The first and second tape head modules 505, 515 each comprise 64 or more monopole writers that are configured for PMR of data to the tape 302, as discussed below in FIG. 6. The monopole write poles of the writers each have a width of about 150 nm, enabling the monopole writers to write on narrow data tracks of the tape 302, such as data tracks having a width of about 150 nm. The monopole writers are configured to write data on particulate tape media, sputtered tape media, or tape media having a soft magnetic underlayer. The first and second tape head modules 505, 515 each comprise 64 or more readers configured to read data written to the tape 302 by the monopole writers.

During operation, when the tape 302 moves in the x-direction, the first row of writers 307 of the first tape head module 505 is configured to write data to the tape, and the second row of readers 319 of the second tape head module 515 is configured to read-verify the newly written data. When the tape 302 moves in the −x-direction, the second row of writers 317 of the second tape head module 515 writes data, and the first row of readers 309 of the first tape head module 505 read-verifies the newly written data. Because the first and second tape head modules 505, 515 are disposed on individual actuators 310, 320, the first and second tape head modules 505, 515 can each individually positioned or adjusted as needed to write and read-verify the data, enabling the tape head module assembly 500 to both write to and read from narrow data tracks that have been written using PMR.

Figure 6:
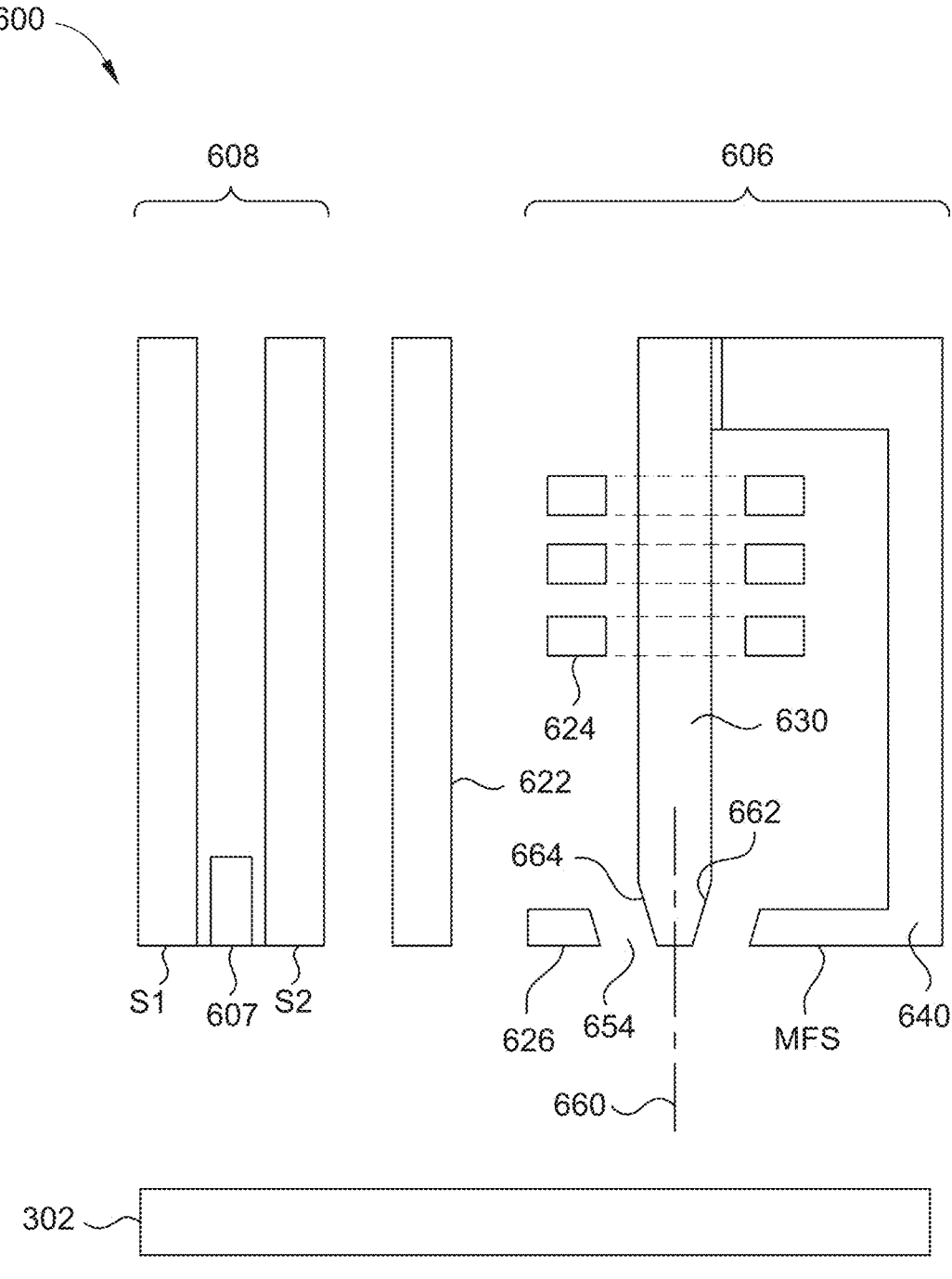
FIG. 6 illustrates a write transducer and a read transducer of a tape head module assembly, according to one embodiment.

FIG. 6 illustrates a write transducer 606 and a read transducer 608 of a tape head module assembly 600, according to one embodiment. The write transducer 606 and the read transducers 608 may be from a pair of tape head modules, such as the pairs of tape head modules 306, 308 of FIGS. 3A-3B or the pairs of tape head modules 406, 408 of FIG. 4. The write transducer 606 and the read transducers 608 may be from a tape head module, such as the tape head modules 505, 515 of FIG. 5. Thus, aspects of the write transducer 606, the read transducer 608, and/or the tape head module assembly 600 can be used in combination with the tape head module assemblies 300, 400, and 500 of FIGS. 3A-5.

In one embodiment, which can be combined with other embodiments, the tape head module assembly 600 includes a magnetic read head 608. The magnetic read head 608 may include a sensing element 607 disposed between shields S1 and S2. The sensing element 607 may be a magnetoresistive (MR) sensing element, such an element exerting a tunneling magneto-resistive (TMR) effect, a magneto-resistance (GMR) effect, an extraordinary magneto-Resistive (EMR) effect, or a spin torque oscillator (STO) effect.

The tape head module assembly 600 includes a write head 606. In one embodiment, which can be combined with other embodiments, the write head 608 includes a main pole 630, a leading shield 626, a trailing shield (TS) 640, and an optional spintronic device (not shown) disposed between the main pole 630 and the TS 640. The main pole 630 may serve as a first electrode. The main pole 630 has a width near the MFS of about 150 nm and can write data to data tracks having a width of about 150 nm using PMR.

In some embodiments, a thin-film plate 622 is disposed between the S2 of the magnetic read head 608 and the leading shield 626 of the write head 608. The plate 622 is optional, and may be excluded. The write head 606 includes a coil 624 around the main pole 630 that excites the main pole 630 to produce a writing magnetic field for affecting a magnetic recording medium of the tape 302. The coil 624 may be a helical structure or one or more sets of pancake structures.

In one embodiment, which can be combined with other embodiments, the main pole 630 includes a trailing taper 662 and a leading taper 664. The trailing taper 662 extends from a location recessed from the MFS to the MFS. The leading taper 644 extends from a location recessed from the MFS to the MFS. The trailing taper 662 and the leading taper 664 may have the same degree or different degree of taper with respect to a longitudinal axis 660 of the main pole 630. In one embodiment, which can be combined with other embodiments, the main pole 630 does not include the trailing taper 662 and the leading taper 644. In such an embodiment, the main pole 630 includes a trailing side and a leading side in which the trailing side and the leading side are substantially parallel.

Therefore, by utilizing two tape head modules disposed on individual actuators, the two tape head modules can be individually moved or tilted as needed for one tape head module to write data to a tape and for the other rape head module to read-verify the newly written data. Moreover, utilizing two tape head modules disposed on individual actuators enables the writers to be monopole writers that are configured for perpendicular magnetic recording of data to the tape. The monopole write poles of the writers each have a width of about 150 nm, enabling the monopole writers to write on narrow data tracks of the tape, such as data tracks having a width of about 150 nm.

In one embodiment, a tape head module assembly comprises a first tape head module comprising a first row of write transducers and a first row of read transducers disposed adjacent to the first row of write transducers on a media facing surface (MFS), a first actuator, wherein the first tape head module is disposed on the first actuator, and wherein the first actuator is configured to tilt the first tape head module, a second tape head module spaced from the first tape head module, the second tape head module comprising a second row of write transducers and a second row of read transducers disposed adjacent to the second row of write transducers on the MFS, and a second actuator, wherein the second tape head module is disposed on the second actuator, wherein the second actuator is configured to tilt the second tape head module, and wherein the first tape head module is operable to write data to a tape and the second tape head module is operable to read-verify the data.

The write transducers of the first tape head module are monopole write transducers, and wherein a tip of a write pole of the monopole write transducers has a width of about 150 nm. The data is written to the tape using perpendicular magnetic recording. The first tape head module is spaced from the second tape head module a distance of about 10 mm to about 50 mm. The first actuator is configured to tilt the first tape head assembly by about 9.5° to about 10.5°, and wherein the second actuator is configured to tilt the second tape head module by about 9.5° to about 10.5°. The first tape head module is statically tilted about 5° to about 10°, and wherein the second tape head module is statically tilted about 5° to about 10°. The first actuator comprises a first arm and a second arm, wherein the first and second arms are configured to individually move the first tape head module in a first direction and a second direction opposite the first direction to tilt the first tape head module, wherein the second actuator comprises a third arm and a fourth arm, and wherein the third and fourth arms are configured to individually move the second tape head module in the first direction and the second direction. The first and second actuators are each individually configured to move in a third direction perpendicular to the first and second directions, and a fourth direction opposite the third direction. A tape drive comprises the tape head module assembly.

In another embodiment, a tape head module assembly comprises a first pair of tape head modules comprising a first write head module and a first read head module disposed adjacent to the first write head module, wherein the first write head module comprises a first row of write transducers, and wherein the first read head module comprises a first row of read transducers, a first actuator, wherein the first pair of tape head modules is disposed on the first actuator, and wherein the first actuator is configured to tilt the first pair of tape head modules, a second pair of tape head modules spaced from the first pair of tape head modules, the second pair of tape head modules comprising a second write head module and a second read head module disposed adjacent to the second write head module, wherein the second write head module comprises a second row of write transducers, and wherein the second read head module comprises a second row of read transducers, and a second actuator, wherein the second pair of tape head modules is disposed on the second actuator, wherein the second actuator is configured to tilt the second pair of tape head modules, and wherein the first pair of tape head modules is operable to write data to a tape and the second pair of tape head modules is operable to read-verify the data.

The write transducers of the first write head module and the second write head module are monopole write transducers, and wherein a tip of a write pole of the monopole write transducers has a width of about 150 nm. The data is written to the tape using perpendicular magnetic recording. The first write head module and the first read head module are bonded together, and wherein the second write head module and the second read head module are bonded together. The first row of write transducers faces the first row of read transducers, and wherein the second row of write transducers faces the second row of read transducers. The first row of read transducers faces a back of the first write head module, and wherein the second row of read transducers faces a back of the second write head module. The first actuator comprises a first arm and a second arm, wherein the first and second arms are configured to individually move the first tape head module in a first direction and a second direction opposite the first direction to tilt the first tape head module, wherein the second actuator comprises a third arm and a fourth arm, and wherein the third and fourth arms are configured to individually move the second tape head module in the first direction and the second direction. The first and second actuators are each individually configured to move in a third direction perpendicular to the first and second directions, and a fourth direction opposite the third direction. A tape drive comprises the tape head module assembly.

In yet another embodiment, a tape drive comprises a tape head module assembly, the tape head module assembly comprising: a first pair of tape head modules comprising a first write head module and a first read head module disposed adjacent to the first write head module, wherein the first write head module comprises a first row of monopole write transducers, each monopole write transducer having a pole tip width of about 150 nm, and wherein the first read head module comprises a first row of read transducers, a first actuator, wherein the first pair of tape head modules is disposed on the first actuator, and wherein the first actuator is configured to tilt the first pair of tape head modules, a second pair of tape head modules spaced from the first pair of tape head modules, the second pair of tape head modules comprising a second write head module and a second read head module disposed adjacent to the second write head module, wherein the second write head module comprises a second row of monopole write transducers, each monopole write transducer having a pole tip width of about 150 nm, and wherein the second read head module comprises a second row of read transducers, and a second actuator, wherein the second pair of tape head modules is disposed on the second actuator, wherein the second actuator is configured to tilt the second pair of tape head modules, and wherein the first pair of tape head modules is operable to write data to a tape using perpendicular magnetic recording and the second pair of tape head modules is operable to read-verify the data.

The first actuator is configured to tilt the first pair of tape head modules by about 9.5° to about 10.5°, and wherein the first tape head module is statically tilted about 5° to about 10°. The second actuator is configured to tilt the second pair of tape head modules by about 9.5° to about 10.5°, and wherein the second tape head module is statically tilted about 5° to about 10°. The tape head module assembly is operable to write to data tracks of a tape having a width of about 150 nm. The first row of write transducers faces the first row of read transducers, and wherein the second row of write transducers faces the second row of read transducers. The first row of read transducers faces a back of the first write head module, and wherein the second row of read transducers faces a back of the second write head module. The first actuator comprises a first arm and a second arm, wherein the first and second arms are configured to individually move the first tape head module in a first direction and a second direction opposite the first direction to tilt the first tape head module, wherein the second actuator comprises a third arm and a fourth arm, and wherein the third and fourth arms are configured to individually move the second tape head module in the first direction and the second direction. The first and second actuators are each individually configured to move in a third direction perpendicular to the first and second directions, and a fourth direction opposite the third direction.

While the foregoing is directed to embodiments of the present disclosure, other and further embodiments of the disclosure may be devised without departing from the basic scope thereof, and the scope thereof is determined by the claims that follow.

What is claimed is:
1. A tape head module assembly, comprising:
a first tape head module comprising a first row of write transducers and a first row of read transducers disposed adjacent to the first row of write transducers on a media facing surface (MFS);
a first actuator, wherein the first tape head module is disposed on the first actuator, and wherein the first actuator is configured to tilt the first tape head module;
a second tape head module spaced from the first tape head module, the second tape head module comprising a second row of write transducers and a second row of read transducers disposed adjacent to the second row of write transducers on the MFS, wherein the first tape head module is spaced from the second tape head module a distance of about 10 mm to about 50 mm; and
a second actuator, wherein the second tape head module is disposed on the second actuator, wherein the second actuator is configured to tilt the second tape head module, and wherein the first tape head module is operable to write data to a tape and the second tape head module is operable to read-verify the data.
2. The tape head module assembly of claim 1, wherein the write transducers of the first tape head module are monopole write transducers, and wherein a tip of a write pole of the monopole write transducers has a width of about 150 nm.
3. The tape head module assembly of claim 1, wherein the data is written to the tape using perpendicular magnetic recording.
4. The tape head module assembly of claim 1, wherein the first actuator is configured to tilt the first tape head module by about 9.5° to about 10.5°, and wherein the second actuator is configured to tilt the second tape head module by about 9.5° to about 10.5°.

5. The tape head module assembly of claim 1, wherein the first tape head module is statically tilted about 5° to about 10°, and wherein the second tape head module is statically tilted about 5° to about 10°.

6. The tape head module assembly of claim 1, wherein the first actuator comprises a first arm and a second arm, wherein the first and second arms are configured to individually move the first tape head module in a first direction and a second direction opposite the first direction to tilt the first tape head module, wherein the second actuator comprises a third arm and a fourth arm, and wherein the third and fourth arms are configured to individually move the second tape head module in the first direction and the second direction.

7. The tape head module assembly of claim 6, wherein the first and second actuators are each individually configured to move in a third direction perpendicular to the first and second directions, and a fourth direction opposite the third direction.

8. A tape drive comprising the tape head module assembly of claim 1.

9. A tape head module assembly, comprising:
a first pair of tape head modules comprising a first write head module and a first read head module disposed adjacent to the first write head module, wherein the first write head module comprises a first row of write transducers, and wherein the first read head module comprises a first row of read transducers;
a first actuator, wherein the first pair of tape head modules is disposed on the first actuator, wherein the first actuator is configured to tilt the first pair of tape head modules, and wherein the first actuator comprises a first arm and a second arm, the first and second arms being configured to individually move the first pair of tape head modules in a first direction and a second direction opposite the first direction to tilt the first pair of tape head modules;
a second pair of tape head modules spaced from the first pair of tape head modules, the second pair of tape head modules comprising a second write head module and a second read head module disposed adjacent to the second write head module, wherein the second write head module comprises a second row of write transducers, and wherein the second read head module comprises a second row of read transducers; and
a second actuator, wherein the second pair of tape head modules is disposed on the second actuator, wherein the second actuator is configured to tilt the second pair of tape head modules, wherein the second actuator comprises a third arm and a fourth arm, and wherein the third and fourth arms are configured to individually move the second pair of tape head modules in the first direction and the second direction, and wherein the first pair of tape head modules is operable to write data to a tape and the second pair of tape head modules is operable to read-verify the data.

10. The tape head module assembly of claim 9, wherein the write transducers of the first write head module and the second write head module are monopole write transducers, and wherein a tip of a write pole of the monopole write transducers has a width of about 150 nm.

11. The tape head module assembly of claim 9, wherein the data is written to the tape using perpendicular magnetic recording.

12. The tape head module assembly of claim 9, wherein the first write head module and the first read head module are bonded together, and wherein the second write head module and the second read head module are bonded together.

13. The tape head module assembly of claim 9, wherein the first row of write transducers faces the first row of read transducers, and wherein the second row of write transducers faces the second row of read transducers.

14. The tape head module assembly of claim 9, wherein the first row of read transducers faces a back of the first write head module, and wherein the second row of read transducers faces a back of the second write head module.

15. The tape head module assembly of claim 9, wherein the first and second actuators are each individually configured to move in a third direction perpendicular to the first and second directions, and a fourth direction opposite the third direction.

16. A tape drive comprising the tape head module assembly of claim 9.

17. A tape drive, comprising:
a tape head module assembly, the tape head module assembly comprising:
a first pair of tape head modules comprising a first write head module and a first read head module disposed adjacent to the first write head module, wherein the first write head module comprises a first row of monopole write transducers, each monopole write transducer having a pole tip width of about 150 nm, and wherein the first read head module comprises a first row of read transducers;
a first actuator, wherein the first pair of tape head modules is disposed on the first actuator, and wherein the first actuator is configured to tilt the first pair of tape head modules;
a second pair of tape head modules spaced from the first pair of tape head modules, the second pair of tape head modules comprising a second write head module and a second read head module disposed adjacent to the second write head module, wherein the second write head module comprises a second row of monopole write transducers, each monopole write transducer having a pole tip width of about 150 nm, and wherein the second read head module comprises a second row of read transducers; and
a second actuator, wherein the second pair of tape head modules is disposed on the second actuator, wherein the second actuator is configured to tilt the second pair of tape head modules, and wherein the first pair of tape head modules is operable to write data to a tape using perpendicular magnetic recording and the second pair of tape head modules is operable to read-verify the data.

18. The tape drive of claim 17, wherein the first actuator is configured to tilt the first pair of tape head modules by about 9.5° to about 10.5°, and wherein the first pair of tape head modules is statically tilted about 5° to about 10°.

19. The tape drive of claim 17, wherein the second actuator is configured to tilt the second pair of tape head modules by about 9.5° to about 10.5°, and wherein the second pair of tape head modules is statically tilted about 5° to about 10°.

20. The tape drive of claim 17, wherein the tape head module assembly is operable to write to data tracks of a tape having a width of about 150 nm.

21. The tape drive of claim 17, wherein the first row of write transducers faces the first row of read transducers, and wherein the second row of write transducers faces the second row of read transducers.

22. The tape drive of claim 17, wherein the first row of read transducers faces a back of the first write head module, and wherein the second row of read transducers faces a back of the second write head module.

23. The tape head module assembly of claim 17, wherein the first actuator comprises a first arm and a second arm, wherein the first and second arms are configured to individually move the first pair of tape head modules in a first direction and a second direction opposite the first direction to tilt the first pair of tape head modules, wherein the second actuator comprises a third arm and a fourth arm, and wherein the third and fourth arms are configured to individually move the second pair of tape head modules in the first direction and the second direction.

24. The tape head module assembly of claim 23, wherein the first and second actuators are each individually configured to move in a third direction perpendicular to the first and second directions, and a fourth direction opposite the third direction.

25. The tape head module assembly of claim 9, wherein the first actuator is configured to tilt the first pair of tape head modules by about 9.5° to about 10.5°, and wherein the second actuator is configured to tilt the second pair of tape head modules by about 9.5° to about 10.5°.

26. The tape head module assembly of claim 9, wherein the first pair of tape head modules is statically tilted about 5° to about 10°, and wherein the second pair of tape head modules is statically tilted about 5° to about 10°.

* * * * *